United States Patent [19]
Phillips

[11] Patent Number: 5,401,054
[45] Date of Patent: Mar. 28, 1995

[54] DEVICE AND METHOD FOR ALIGNING THE REAR WHEELS OF AN AUTOMOBILE

[76] Inventor: Richard A. Phillips, 1348 Washam Rd., Eagle, Id. 83616

[21] Appl. No.: 171,218

[22] Filed: Dec. 20, 1993

Related U.S. Application Data

[63] Continuation-in-part of Ser. No. 943,702, Sep. 10, 1992, abandoned.

[51] Int. Cl.$^6$ .............................................. B60G 11/02
[52] U.S. Cl. ...................................... 280/718; 267/52
[58] Field of Search ............... 280/661, 718, 719, 720; 180/359, 360; 267/52, 262

[56] References Cited

U.S. PATENT DOCUMENTS

| | | |
|---|---|---|
| 1,268,077 | 5/1918 | Klein . |
| 2,284,245 | 5/1942 | Ayers ..................... 280/80 |
| 3,111,309 | 11/1963 | Andren et al. ................. 267/52 |
| 3,213,959 | 10/1965 | Rist ............................. 180/73 |
| 3,645,555 | 2/1972 | Traylor ..................... 280/104.5 |
| 3,674,249 | 7/1972 | McGee ......................... 267/52 |
| 3,730,508 | 5/1973 | Marian et al. ................. 267/52 |
| 3,891,197 | 6/1975 | Poulos ..................... 267/52 X |
| 4,033,609 | 7/1977 | Malcolm ..................... 280/718 |
| 4,077,654 | 3/1978 | Brandt ........................ 280/718 |
| 4,519,590 | 5/1985 | Wells .......................... 267/52 |
| 4,598,900 | 7/1986 | Yamamoto et al. ............ 267/52 |
| 4,718,691 | 1/1988 | Specktor et al. ............. 280/661 |
| 5,016,861 | 5/1991 | Thompson et al. ......... 267/52 X |
| 5,046,756 | 9/1991 | Hertrick ..................... 280/718 |

FOREIGN PATENT DOCUMENTS

56924/90  3/1991  Australia .

*Primary Examiner*—Margaret A. Focarino
*Assistant Examiner*—Victor E. Johnson
*Attorney, Agent, or Firm*—Klarquist Sparkman Campbell Leigh & Whinston

[57] ABSTRACT

A first plate is removably secured to the leaf spring of an automobile. The first plate defines an aperture that receives a centering pin on the leaf spring. The first plate also includes a pair of rails that are connected to and extend from a top surface of the first plate, thereby defining a recessed region. A second plate is removably secured to a differential housing bracket of the automobile and is sized to be received in the recessed region of the first plate. The second plate includes a pin that extends from a top surface of the plate and is received in an aperture of at least one of an automobile's differential housing brackets. To correct a misalignment, the leaf spring is separated from the differential housing of the automobile. The first plate is removably secured to the leaf spring of the automobile, and the second plate is removably secured to the differential housing bracket of the automobile. The first plate is then positioned on top of and in contact with the second plate by lowering the weight of the automobile onto the suspension system. The misalignment is corrected by adjusting the position of the first plate relative to the position of the second plate along a longitudinal axis of the automobile while the plates support the weight of the automobile. The plates are then secured to each other.

18 Claims, 4 Drawing Sheets

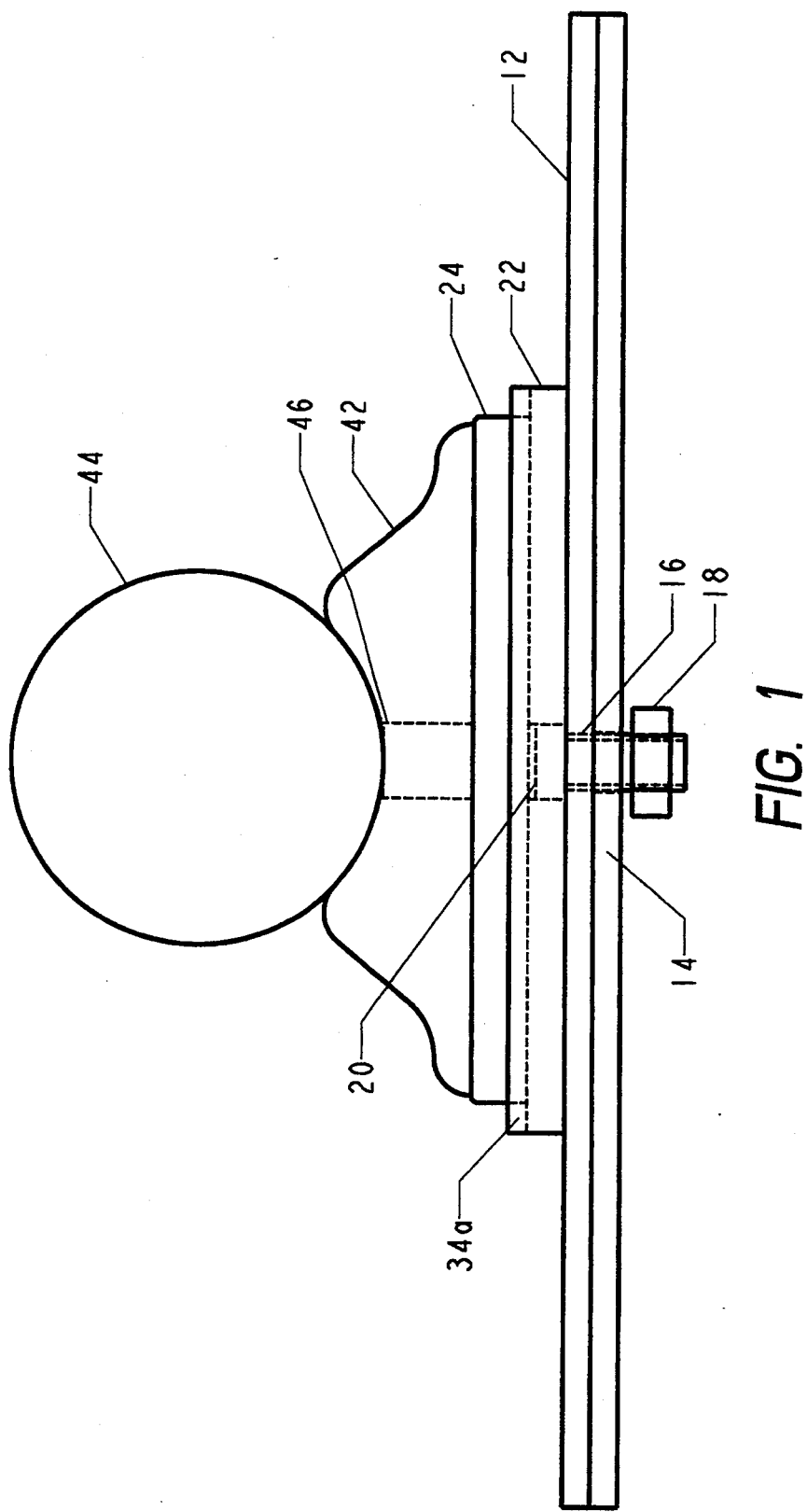

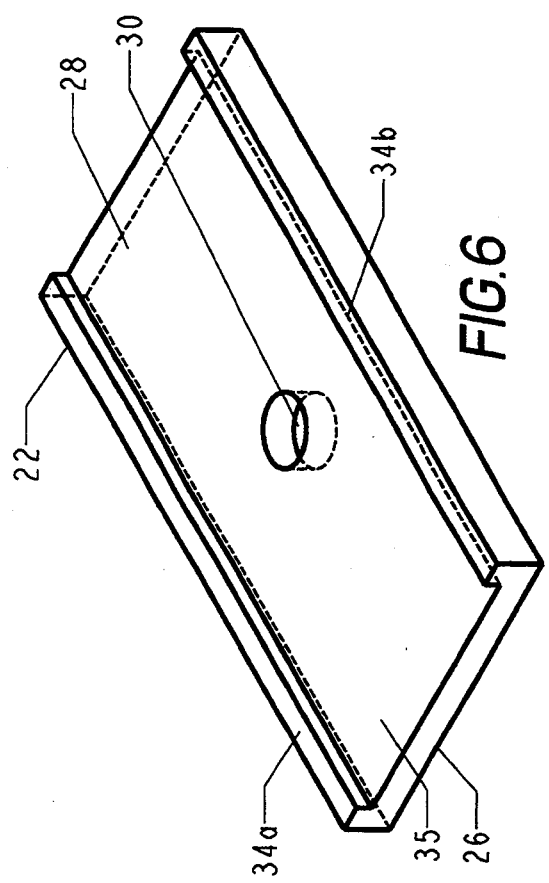
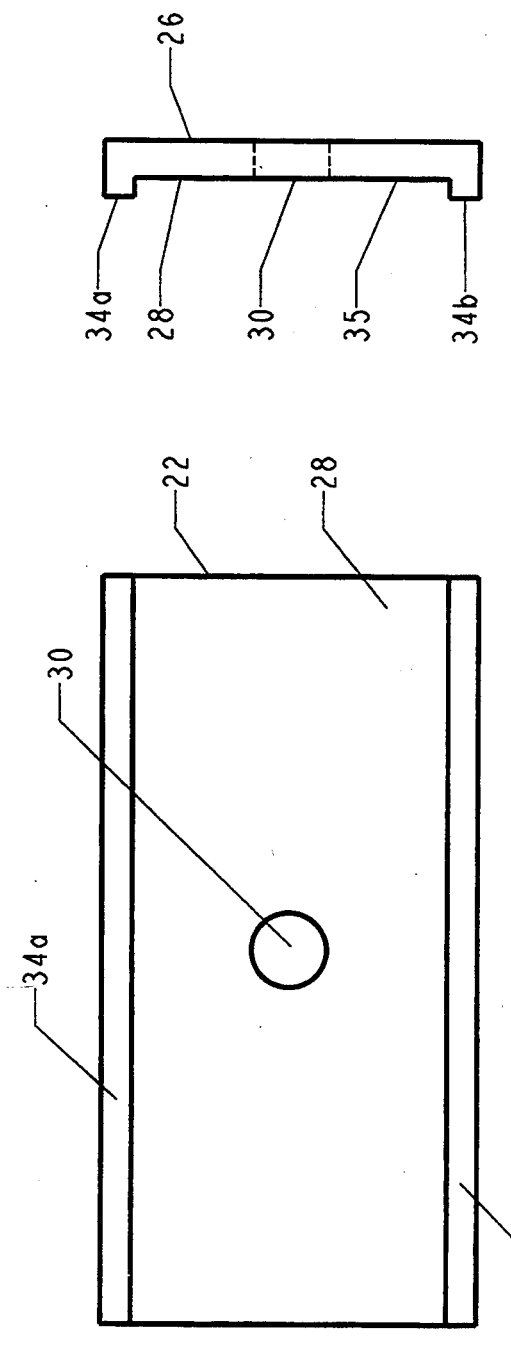

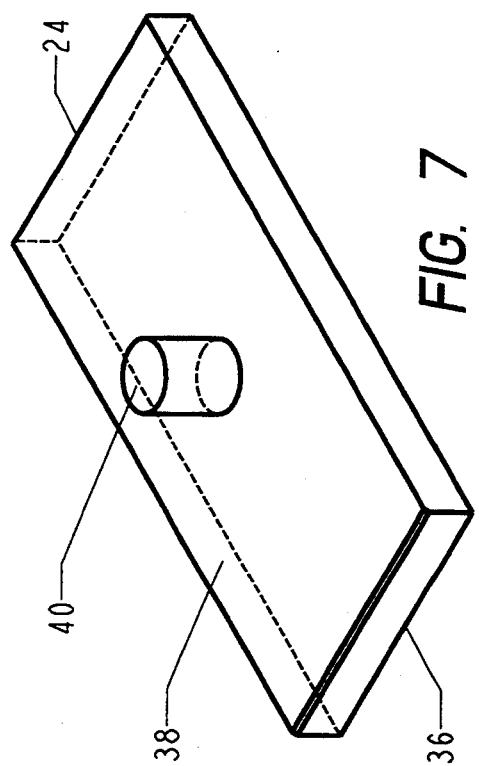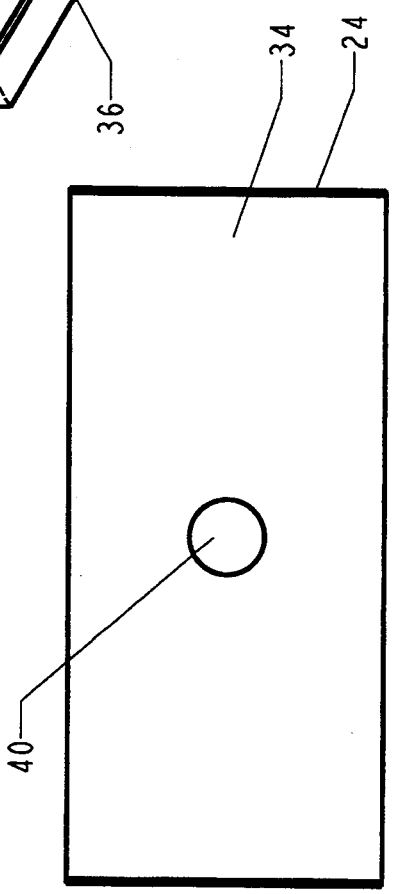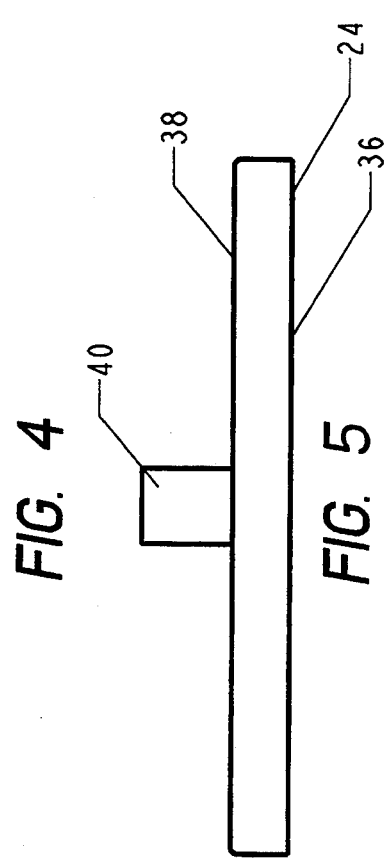

DEVICE AND METHOD FOR ALIGNING THE REAR WHEELS OF AN AUTOMOBILE

CROSS REFERENCE TO RELATED APPLICATION

This application is a continuation-in-part of U.S. Patent Application Ser. No. 07/943,702, filed Sep. 10, 1992, entitled "DEVICE AND METHOD FOR ALIGNING THE REAR WHEELS OF AN AUTOMOBILE," now abandoned, which application is incorporated herein by reference.

FIELD OF THE INVENTION

This invention relates to a method and device for aligning the rear wheels of an automobile.

BACKGROUND OF THE INVENTION

Automobiles having leaf-spring suspension systems are manufactured with the rear wheels aligned in a fixed position. This is acceptable as long as the alignment of a particular vehicle complies with the specifications established by the manufacturer. However, rear-wheel misalignment not conforming to the manufacturers' specifications may occur either upon production or subsequent to production as the result of an accident. Rear-wheel misalignment compromises the performance of the vehicle. For instance, misalignment causes undue and uneven wear on the automobile's tires, unsatisfactory handling, and stress on components such as the rear wheel axle assembly.

Prior devices have not been developed specifically for correcting rear-wheel misalignment in sport or utility automobiles. However, several inventions have been patented for mounting or balancing the load on suspension systems. For instance, Marian's U.S. Pat. No. 3,730,508 describes a device for mounting the axles of a vehicle to a vehicle's suspension system. The device allows movement of the axle to properly balance a load placed on the leaf spring. The device comprises an upper plate 24, a spacer block 28, an adjustment block 46, and a support block 56. Of these elements, spacer block 28 and adjustment block 46 are in mating face-to-face contact with each other, as are adjustment block 46 and support block 56. These are the only two pairs of mating plates or blocks described. Both pairs have mating surfaces that bearingly interengage one another, allowing discrete adjustment, but preventing infinite adjustability. This is because the support block includes a projecting lug that fits in one of a plurality of recesses provided at specific intervals in the spacer block, and because the adjustment block and support block have engagable teeth. Marian's device was designed such that the blocks and plates matingly interlock with each other to only allow specific, incremental axle adjustments that are determined by the distance between the recesses. Moreover, the spacer block increases the rideheight of a vehicle, which is aesthetically unacceptable.

Traylor's U.S. Pat. No. 3,645,555 describes a tandem axle suspension system designed for heavy-duty highway transport vehicles. This invention employs two plates that are attached to the axle and leaf spring of the transport vehicle. The plates have serrated faces that allow only specific, incremental adjustments of the axle position along the spring axis. Furthermore, as with Marian's device, axle adjustments can not be achieved while the device supports the weight of the automobile. The adjustment must be tested while the suspensions system bears the weight of the automobile. If the adjustment does not achieve the desired correction, the weight of the automobile again must be removed from the suspension system and a new adjustment tried.

Similarly, Hertrick's U.S. Pat. No. 5,046,756 and Australian patent No. AU-B-56924/90 describe a device that is designed for long-haul heavy vehicles having a rigid or beam-type drive axle assembly supported by a compound leaf-spring assembly. Hertrick's invention comprises a pair of opposed plates that are bearingly interengagable. One of these plates is secured against axial movement relative to the vehicle's suspension assembly, and the other plate is secured against axial movement relative to a wheel axle. Each of the plates includes a surface designed to matingly interlock with the opposed plate to prevent movement relative to each other when bearingly interengaged. Preferred embodiments of the bearing plates include complementary corrugations oriented transversely to the direction of relative movement.

As with the Marian and Traylor inventions, Hertrick's invention permits only specific, predetermined incremental plate adjustments in a direction transverse to the orientation of the corrugations, i.e., along the longitudinal axis of the vehicle. If the preferred alignment position occurs at a point intermediate the corrugation recesses, then the preferred alignment position can not be achieved. Furthermore, as with the Marian and Traylor patents, if an adjustment is incorrect, Hertrick's two plates are interlocked with each other and cannot be adjusted relative to each other while the suspension system bears the weight of the automobile. Therefore, the weight of the automobile must be removed from the suspension system and a new adjustment tried.

To align the rear wheels of an automobile using Hertrick's device, it is first necessary to calculate the actual angle at which the axle is installed. The actual angle is then compared with the optimum angle to determine the angular misalignment. The angular misalignment must then be converted to a linear distance using a geometric formula. The opposed plates are then positioned between the leaf-spring suspension assembly and the differential housing. The linear misalignment distance is then corrected, if possible, by moving the plates relative to each other in increments corresponding to the specific, predetermined distances provided by the corrugated opposed plates. If the misalignment condition is not calculated correctly, then the whole assembly must be disassembled to correct for the miscalculation.

Hertrick's invention was designed solely for use with long-haul trucks having a resilient block, which is shown as element 33 in FIG. 3 of Hertrick's patent. Thus, to use Hertrick's device, an automobile must include the rubber block 33 when the automobile is purchased. Alternatively, the automobile's differential housing bracket must be removed and the resilient block installed between the axle and the adjustment device. Virtually none of the automobiles currently being sold include a resilient rubber block. Therefore, to use Hertrick's device requires that the differential housing bracket be removed and a rubber resilient block attached to the differential housing prior to adjusting the suspension system. Introducing the resilient block required by Hertrick substantially increases the ride height of the automobile. Furthermore, the resilient block requires using an attachment bracket. This bracket, which extends from and interrupts the bottom surface of the lower plate, allows the plate to be attached to the resilient block.

Preferred devices for correcting a misalignment must resist the transverse movement of the automobile. Hertrick's device includes only screws that prevent such movement. These screws (element 92 in Hertrick) are set in recessed regions that are machined in the top plate. These recessed regions do not extend upwardly from this plate, and therefore likely do not provide adequate resistance to the transverse shearing motions that occur with an automobile.

For the reasons stated above, Hertrick's invention is labor intensive. Moreover, Hertrick's invention does not cure all the problems associated with curing a misalignment. For instance, Hertrick's invention provides only specific, incremental adjustment capability. Hertrick's device does not allow infinite adjustment capability along the area of contact between the plates comprising the device, and therefore cannot achieve the optimal position for curing the misalignment.

McGee's U.S. Pat. No. 3,674,246 describes a device that allows an axle and spring beam of an automobile to be adjustably positioned relative to each other. The device comprises a rectangular adjustment plate that rests on an upper leaf of the spring beam, and an arcuate saddle block that accommodates an automobile's axle. The device allows adjustable positioning of the axle relative to the beam members. McGee's device requires that the saddle block be permanently secured to the axle to prevent transverse movement of the axle relative to the beam. Hence, repositioning the axle, which may be necessary after an accident or if the optimum alignment is not obtained on the first try, is difficult and requires severing the weld between the axle and saddle block. Severing the weld is not only inefficient, but may damage the axle or the saddle block.

All the inventions discussed above provide inadequate means for accommodating the substantial transverse shearing forces, especially between matingly-engagable adjustment plates, that are generated by automobiles. Alternatively, the inventions discussed above require inefficient and permanent alterations to the automobile, making subsequent adjustments difficult. Both the Marian and Traylor inventions provide only opposed, bearingly-engagable plates joined by U-bolts that extend through the leaf-spring assembly. Hertrick's invention uses screws that extend through the top plate and into a tapped region of the bottom plate. The length of these screws is limited by ride-height considerations, whereas increased screw-diameter necessarily weakens the top and bottom plates that must accommodate the screws. McGee's invention permanently secures the saddle block to the axle.

SUMMARY OF THE INVENTION

The present invention provides a method and device for aligning the rear wheels of an automobile that solves the problems identified above. As used herein, "automobile" is defined to mean any vehicle having a leaf-spring suspension system. More specifically but without limitation, "automobile" includes transportation devices having rear wheels, a leaf-spring suspension system that supports the automobile's body, and a differential housing bracket. The leaf spring may be beneath or on top of the bracket. Hence, "automobile" includes, without limitation, passenger cars, sport vehicles, trucks, including trucks up to about five tons, and utility vehicles.

One object of the present invention is a device that allows efficient, rear-wheel misalignment correction, while providing substantial resistance to transverse shearing forces generated by an automobile after the device is installed.

Another object of the present invention is to provide an alignment device that enables linear adjustments that are not limited by predetermined adjustment positions, while providing substantial resistance to transverse shearing forces generated by an automobile after the device is installed.

Still another object of the present invention is a device that allows an infinite number of longitudinal adjustments along an area of mating contact between opposed plates comprising the device, while also providing substantial resistance to transverse shearing forces after the device is installed.

Another object of the method of the present invention is to allow an infinite number of adjustments while the opposed plates bear the weight of the vehicle.

Still another object of the present invention is to provide a device for aligning the rear wheels of an automobile that does not require modifying the automobile.

Still another object of the present invention is to provide a device for aligning the rear wheels of an automobile that does not require modifying the automobile and does not substantially increase the ride height of the automobile.

One embodiment of the present invention comprises a rear-wheel alignment device for an automobile having leaf-springs and, without modification, at least one differential housing bracket. The device comprises first and second plates wherein the first plate has a substantially continuous bottom surface. As used herein, "substantially continuous bottom surface" means, without limitation, that the surface of the plate does not include serrations, indentations or additional elements, such as attachment brackets. The first plate also includes a pair of substantially parallel rails that extend upwardly from a substantially smooth upper surface of the first plate and along the entire length of the first plate. The upper surface of the first plate and the rails define a recessed region for receiving the second plate. The second plate also has a substantially smooth lower surface. When installed, the lower surface contacts and adjustably engages the upper surface of the first plate. The plates are positioned between and, respectively, removably secured to one of the leaf springs and differential housing brackets of the automobile. When the plates are so positioned, the combined height of the two plates is less than about 0.5 inch, and hence such plates do not substantially increase the ride height of the automobile.

Typically, the automobile has a centering pin on the leaf spring and the differential housing brackets define apertures to receive the pin. In such a case, the first plate defines an aperture for receiving the centering pin on the leaf spring, and the second plate includes an attachment pin shaped to be received in the aperture defined by the differential housing bracket. This embodiment of the present invention, as well as the others described below, is superior to Hertrick's device because the position of the second plate can be adjusted relative to the first plate in an infinite number of longitudinal positions along an area of contact between the plates. Furthermore, the rails are better capable of resisting the transverse shearing motions that are generated by an automobile relative to the attachment screws taught by Hertrick.

Another embodiment of the present invention also provides a rear-wheel alignment device for an automobile having leaf-springs and differential housing brackets. The device comprises adjustably engaging first and second plates that are positioned between the leaf spring and the differential housing bracket of the automobile. The first plate has a substantially flat, continuous bottom surface. The first plate also includes a pair of substantially parallel rails that extend from an upper surface thereof. The upper surface and the rails define a recessed region. The second plate has a substantially smooth bottom surface that is at least partially received in the recessed region so that the upper surface of the first plate and the lower surface of the second plate are in face-to-face contact. The recessed region helps prevent the second plate from moving in a direction transverse to the longitudinal axis of the automobile. The first and second plates typically are removably secured to the leaf spring and differential housing bracket respectively.

Still another embodiment of the present invention comprises a rear-wheel alignment device for an automobile having leaf-springs, the leaf springs having a centering pin, the automobile also including at least one differential housing bracket. The bracket(s) define a first aperture configured to receive the centering pin. The device includes a first plate that is removably secured to a leaf spring of the automobile. The first plate has a substantially smooth and continuous bottom surface and a pair of rails that are connected to and extend from an upper surface of the first plate. The first plate also defines a second aperture configured to receive the centering pin. The device also includes a second plate that has a smooth lower surface that adjustably engages in face-to-face contact the upper surface of the first plate between the rails. The second plate includes an attachment pin configured to be received in the first aperture, the pin extending from an upper surface of the second plate. The second plate is removably secured to at least one of the differential housing brackets of the automobile. The mating surfaces of the plates are substantially smooth.

Without limitation, a preferred embodiment of the present invention comprises a rear-wheel alignment device for use with an automobile having an axle, a leaf-spring, a centering pin on the leaf spring, and at least one differential housing bracket that defines an aperture configured to receive the centering pin. The device includes a first plate that is removably secured to the leaf spring. The first plate has a substantially continuous bottom surface and a smooth upper surface. The first plate also includes a pair of substantially parallel rails connected to and extending upwardly from the upper surface of the first plate. The rails are spaced apart and extend the entire length of the first plate, so that the rails and the upper surface define a channel. The first plate also defines an aperture that passes through the upper surface. This aperture is configured for receiving the centering pin on the leaf spring. The device also includes a second plate having an attachment pin that extends from an upper surface of the second plate. The attachment pin is shaped to be received in the aperture defined by the differential housing bracket. The second plate also has a substantially smooth lower surface that is in face-to-face contact with the upper surface of the first plate when the plates are used to correct a misalignment condition of an automobile. This forms an area of contact between the first plate and the second plate. The lower surface of the second plate is, at least in part, received within the channel such that the second plate is constrained for infinitely adjustable linear movement between the rails and along the entire area of contact within the channel when the upper surface of the first plate is in contact with the lower surface of the second plate. Therefore, the weight of the automobile is transmitted between the first and second plates. Furthermore, the surfaces of the two plates are sufficiently smooth to permit adjustment of the plates relative to each other while bearing the weight of the automobile. The second plate typically is removably secured to a differential housing bracket of the automobile. The first plate usually is welded to the second plate after the plates are adjusted relative to each other.

The present invention also provides a method for aligning an automobile's rear wheel without modifying the automobile to include differential housing brackets. The automobile typically includes: leaf springs; a differential housing; a passenger's side differential housing bracket; and a driver's side differential housing bracket. The method comprises first separating at least one leaf spring from a differential housing of the automobile. Thereafter, a first plate is removably secured to the leaf spring of the automobile. The first plate has a substantially smooth, continuous lower surface and a smooth upper surface wherein the upper surface includes a pair of substantially parallel rails. These rails extend upwardly from the upper surface and typically along the entire length of the first plate. A second plate then is removably secured to at least one of the differential housing brackets of the automobile. The second plate has a substantially smooth lower surface. The first plate then is positioned on top of the second plate so that at least a portion of the lower surface of the upper plate is received between the rails. The substantially smooth upper surface of the lower plate is in face-to-face contact with the lower surface of the upper plate. The position of the first plate then is adjusted relative to the position of the second plate along a longitudinal axis of the automobile while the plates are in face-to-face contact and while the plates bear the weight of the automobile. Once the correct position to cure the misalignment is achieved, the plates then are permanently secured to each other, thereby rendering the plates non-adjustable. One method, without limitation, of permanently securing the two plates together is welding the first plate to the second plate.

The method also may involve attaching first and second plates to a leaf spring and differential housing bracket on both the driver's side and passenger's side of the automobile. The substantially smooth surfaces of the two plates allow the plates to slide relative to each other while in contact. The method also allows the position of the plates to be adjusted with the leaf springs bearing the weight of the automobile. This is an important aspect of the present invention because it simplifies the adjustment process and therefore provides a superior alignment device and method relative to the inventions discussed in the Background of the Invention. Furthermore, the plates can be secured to each other while bearing the weight of the automobile, which also provides a superior invention relative to those discussed in the Background of the Invention.

A preferred embodiment of the method of the present invention utilizes an automobile without modifying it to include a differential housing bracket. Moreover, the automobile includes an axle, leaf-springs, a centering pin on the leaf spring, a differential housing, and differential housing brackets wherein each bracket defines an aperture configured to receive the centering pin. According to the method, at least one leaf spring is separated from a differential housing of the automobile. A first plate then is secured to the leaf spring of the automobile, wherein the first plate has a substantially smooth, continuous bottom surface a smooth upper surface. The first plate also includes a pair of substantially parallel rails connected to and extending upwardly from the upper surface and along the entire length of the first plate. The rails are spaced apart so that the rails and the upper surface define a channel or a recessed region. The first plate also defines an aperture passing through the upper surface, wherein the aperture is configured for receiving the centering pin.

A second plate is removably secured to a differential housing bracket of the automobile wherein the second plate has an attachment pin connected to an upper surface thereof. The attachment pin is shaped to be received in the aperture defined by the differential housing bracket. The second plate also has a substantially smooth lower surface. The lower surface of the second plate is placed in face-to-face contact with the upper surface of the first plate, thereby forming an area of contact between the first and second plates. The lower surface of the second plate then is, at least in part, received within the channel. Thus, the second plate is constrained for infinitely adjustable linear movement within the channel and between the rails along the area of contact when the upper surface of the first plate is in contact with the lower surface of the second plate. As a result, the weight of the automobile may be transmitted between the first and second plates. The surfaces of the plates are sufficiently smooth to permit adjustment of the plates relative to each other while bearing the weight of the automobile. Once the plates are properly positioned, they are maintained in contact while the position of the first plate is adjusted relative to the position of the second plate along a longitudinal axis of the automobile while the plates are in contact and bear the weight of the automobile. Thereafter, the first plate is welded to the second plate without first removing the weight of the automobile from the plates.

BRIEF DESCRIPTION OF THE DRAWINGS

FIG. 1 is a side view of a thrust-plate alignment assembly positioned between a leaf spring and differential housing bracket of an automobile.

FIG. 2 is a plan view of a base plate according to the present invention.

FIG. 3 is an end view of a base plate according to the present invention.

FIG. 4 is a plan view of a top plate according to the present invention.

FIG. 5 is a side view of a top plate according to the present invention.

FIG. 6 is a perspective view of the base plate of FIG. 1.

FIG. 7 is a perspective view of the top plate of FIG. 4.

DETAILED DESCRIPTION

Figure 8:
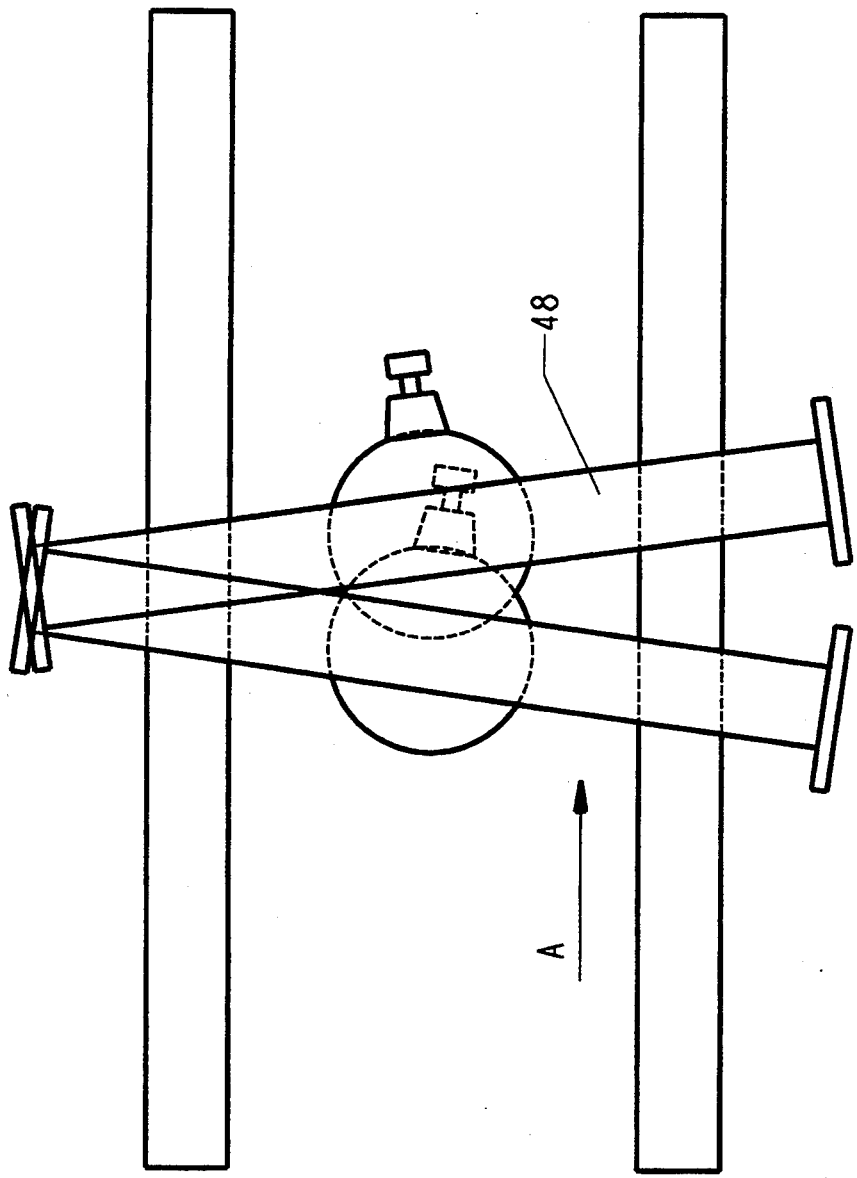
FIG. 8 is a schematic view of an automobile having an exaggerated rear-wheel misalignment.

A device according to the present invention allows movement of the leaf spring of an automobile relative to the differential housing of an automobile for correcting rear-wheel misalignment. The device is referred to herein as a thrust-plate alignment assembly. FIG. 1 shows the thrust-plate alignment assembly, comprising plates 22 and 24, positioned between the leaf spring 12 of an automobile and differential housing bracket 42. Leaf spring assembly 12 includes centering pin 14 that extends through an aperture 16. Attachment nut 18, tapped to receive threaded centering pin 14, secures centering pin 14 in position. Centering pin 14 includes head 20 that extends above the upper surface of the leaf spring. Head 20 has a slightly larger diameter than centering pin 14. Head 20 generally has a diameter of from about ⅜ inch to 11/16 inch (10 to 25 mm), depending upon the automobile and the manufacturer.

One skilled in the art will realize that bottom plate 22 and top plate 24 can be made of any suitable material that can bear the weight of the automobile and resist the forces to which the device is subjected. A particularly suitable material for making both the bottom and top plates 22, 24 respectively is steel. However, aluminum and high density plastics are also suitable for the present invention.

As shown in FIG. 6, bottom plate 22 has two major parallel opposed surfaces 26, 28. These surfaces are substantially smooth and continuous. As used herein, "substantially smooth" means that the surfaces have no ridges or corrugations, or that the surfaces have minor ridges or corrugations that do not prevent plates 22 and 24 from sliding relative to each other when they are in contact. Bottom plate 22 defines an aperture 30 (shown in FIGS. 2, 3 and 6) that extends through the bottom plate 22. Aperture 30 is sized to receive head 20 of centering pin 14 on leaf spring 12. By inserting head 20 into aperture 30, bottom plate 22 is removably secured to leaf spring 12.

As shown in FIGS. 2, 3 and 6, bottom plate 22 includes side rails 34a and 34b that extend upwardly from the upper surface 28. The rails are spaced apart and extend the entire length of the first plate. Side rails 34a and 34b define a recessed region 35 sized to receive and accommodate top plate 24. Rails 34a and 34b can be produced by removing material in the recessed region. This can be done, for instance, using a steel milling machine. Alternatively, rails 34a and 34b can be attached, such as by welding, to the upper surface 28 of plate 22. Rails 34a and 34b are generally substantially parallel, and with the upper surface 28 of plate 22 form a channel to allow top plate 24 to be at least in part adjustably received within the channel. As used herein the phrases "adjustably received" or "adjustably engaging" mean, without limitation, that the plates 22 and 24 have infinitely adjustably linear movement relative to each other, such as by sliding, while a surface of bottom plate 22 is in mating, face-to-face contact with a surface of top plate 24. Because the first plate has a substantially smooth, continuous lower surface and the second plate has a substantially smooth, continuous upper surface, the plates can slide relative to each other over an infinite number of longitudinal positions along an area of contact between the two plates.

FIG. 1 shows bottom plate 22 positioned on top of leaf spring assembly 12 so that centering pin 14 and head 20 extend upwardly through aperture 30. Aperture 30 is sized specifically to receive the attachment pin 14 and head 20, and hence generally has inner diameter dimensions of from about ⅜ inch to 11/16 inch (10 to 25 mm). Although this dimension may vary, a typical inner dimension of aperture 30 is approximately ½ inch (13 mm). A preferred embodiment of the present invention provides a bottom plate 22 having a width of approximately 2½ inches (63.5 mm), and a bottom plate length of approximately 5¼ inches (127 mm). One skilled in the art will realize that these dimensions may vary depending upon the particular automobile on which the device is used. For instance, foreign automobiles typically include a spring having a width of about 2 inches. Domestic automobiles typically include a spring having a width of about 2.5 inches, whereas utility vehicles include a spring with a width that is less than about 2 inches. The width of the bottom plate 22 preferably is substantially the same as the width of the spring. Hence the width of plate 22 may vary depending upon the automobile on which the plate is to be installed. The length of the plates also may vary; however, applicant has determined that a length for bottom plate 22 of about 5 to about 5½ inches will suffice for most applications.

Bottom plate 22 is removably secured to the leaf spring assembly 12 by placing bottom plate 22 on top of leaf spring assembly 12 as shown in FIG. 1. Centering pin 14 extends through aperture 30 so that head 20 is flush with upper surface 28 of bottom plate 22. As shown in FIG. 6, rails 34a and 34b extend upwardly from surface 28 of alignment plate 22. A preferred embodiment provides rails 34a, 34b that extend upwardly approximately ⅛ inch (3 to 4 mm), although this dimension may vary. Rails 34a and 34b are included on bottom plate 22 to resist transverse motion of top plate 24 relative to the longitudinal axis of the automobile. Hence, the greater the height and width of the rails 34a and 34b, the greater the resistance against transverse shearing motions. However, there is a limitation to the height of the rails 34 because, by increasing the height of such rails, the height of the rear end of the automobile is also increased. Although the width of rails 34a and 34b may also vary, a particularly suitable width for the rails is approximately ¼ inch (6 to 7 mm).

After removably securing bottom plate 22 to one of the leaf springs 12 of an automobile via centering pin 14, top plate 24 may be positioned in the recessed region of bottom plate 22. FIGS. 5 and 7 show top plate 24 having two parallel major opposed surfaces, bottom surface 36 and top surface 38. Hence, when the thrust-plate alignment assembly comprising bottom plate 22 and top plate 24 are assembled, bottom surface 36 of top plate 24 is positioned above and in face-to-face contact with upper surface 28 of bottom plate 22. The width of top plate 24 is such that the top plate 24 fits within the recessed region defined in bottom plate 22. A particularly suitable embodiment of the present invention provides a top plate 24 having a width similar to that of differential housing bracket 42. The present invention is not limited to having a width that is the same as differential housing bracket 42; however, if the mating surfaces between bracket 42 and top plate 24 have approximately the same surface area, the weight of an automobile is distributed in the same manner as when manufactured. A particularly suitable width has been found to be approximately 1 15/16 inches (50 mm).

Top plate 24 is smaller in length than bottom plate 22. A particularly suitable length for top plate 24 has been found to be approximately 4 7/16 inches (113.5 mm). This length is smaller than the length of bottom plate 22 by approximately 0.75 inch. This difference in length equals the linear adjustment capability of the thrust-plate alignment assembly. The length of top plate 24 can be decreased to provide greater linear adjustment, although this decrease in length must be balanced by considering the surface area, and hence weight distribution accommodated by the top plate.

When top plate 24 is positioned in the recessed region defined by rails 34a and 34b, the substantially smooth, continuous bottom surface 36 of top plate 24 engages the substantially smooth, continuous top surface 28 of bottom plate 22. The smooth surfaces of the plates 22 and 24 allow the top plate 24 to slide relative to plate 22 within the recessed region defined by rails 34a, 34b. The two plates can slide relative to each other even when supporting the weight of an automobile.

The top surface 38 of top plate 24 includes an attachment pin 40. Attachment pin 40 is centered on the top surface 38. This departs from the device taught by Hertrick, wherein the pins are off-center by about 4 mm. This off-center pin increases the difficulty of manufacturing the Hertrick device relative to the device of the present invention. A preferred attachment pin 40 for the present invention extends from the upper surface 38 of top plate 24 approximately ½ inch (13 mm), and has a diameter of approximately 7/16 inch (12 mm). However, one skilled in the art will realize that such dimensions may vary according to the intended use of the thrust-plate alignment assembly. For instance, should the thrust-plate alignment assembly be used on a heavy-load vehicle, the dimensions of pin 40 may be increased.

Attachment pin 40 is sized to fit in aperture 46 of differential housing bracket 42 as shown in FIG. 1. Differential housing bracket 42 is attached to differential housing 44 by the manufacturer. Attachment pin 40 is cut to the desired length from cylindrical steel stock having a diameter slightly less than aperture 46. The cut pin 40 is then heliarc welded to the plate 24. Top plate 24 is secured against longitudinal movement relative to the chassis of an automobile by inserting pin 40 in aperture 46.

FIG. 8 shows an exaggerated misalignment condition for an automobile. Differential housing 48 must be moved relative to the longitudinal axis of the car, indicated by arrow A, to correct the misalignment condition. To do so, the weight of the automobile must be removed from the suspension system and differential housing 48. For a 4-wheel drive vehicle, you must jack up the body of the vehicle to remove the weight from the spring as it sits on the rear-end housing. For a 2-wheel drive vehicle, the rear-end housing must be jacked up because the rear-end housing is above the spring. U-bolts connect the leaf-spring 12 to the differential housing 48. After the weight is removed from the suspension system or differential housing 48, U-bolt attachment nuts (not shown) are removed, which allows the leaf-spring 12 to be separated from the differential housing 48. Bottom plate 22 is then removably connected to the leaf spring 12 of the automobile via the centering pin 14. Thereafter, attachment pin 40 is inserted into aperture 46 of differential housing bracket 42, or top plate 24 is placed in the recessed region of bottom plate 22. The automobile is then lowered so that the thrust-plate alignment assembly and suspension system 12 supports the weight of the automobile.

To correct a misalignment, top plate 24 must be moved relative to the position of bottom plate 22 with the weight of the automobile supported by the suspension system. This has been achieved by attaching a come-along to a rigid structure on the underside of the automobile. Alternatively, an hydraulic port-o-power may be used in place of the come-along. The come-along, or port-o-power, allows an operator to incrementally move the top plate 24, relative to bottom plate 22, in a linear direction along the longitudinal axis of the automobile. The surfaces of the plates 22 and 24 are substantially smooth and continuous so that the plates can slide while bearing the weight. The top plate 24 can be moved to an infinite number of positions along the area of mating contact between the two plates until the exact, corrected position is achieved.

In such fashion, the leaf spring 12 can be adjusted relative to the differential housing bracket 42 along the longitudinal axis of an automobile. Hence, as shown in FIG. 8, the position of differential housing 48 can be adjusted to correct the misalignment condition. Because top plate 24 is smaller than bottom plate 22 by approximately ¾ inch, the adjustment of top plate 24 relative to bottom plate 22 is also approximately ¾ inch. This corresponds to approximately 0.5 to 1.0 degree of angular misalignment position. Once the misalignment condition is corrected, top plate 24 must be permanently secured to bottom plate 22 in order to prevent movement of the two plates relative to each other, thereby rendering the plates non-adjustable. This attachment is typically done by welding the top plate 24 to the bottom plate 22. Thereafter, the U-bolts are installed and tightened.

If the misalignment condition shown in FIG. 8 is too extensive to be corrected by one thrust-plate alignment assembly, two thrust-plate alignment assemblies can be used in tandem to provide a linear correction of approximately 1 inch. This corresponds to a correction of about 1.0 to 2.0 angular degrees. Two thrust-plate alignment assemblies are positioned between leaf spring 12 and differential housing bracket 42 on both the driver's side and on the passenger's side of an automobile. Hence, two bottom plates 22 are positioned to receive two top plates 24 so that the misalignment can be corrected.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. A rear-wheel alignment device for an automobile having leaf-springs and differential housing brackets, the device comprising first and second plates, the first plate having a substantially continuous bottom surface and including a pair of substantially parallel rails that extend upwardly from a substantially smooth upper surface of the first plate and along the entire length of the first plate, the upper surface and the rails defining a recessed region for receiving the second plate, the second plate having a substantially smooth lower surface which lower surface adjustably engages and is in contact with the upper surface of the first plate, the plates being positioned between and, respectively, removably secured to one of the leaf springs and differential housing brackets of the automobile.

2. The device according to claim 1 wherein the automobile has a centering pin on the leaf spring and wherein at least one of the differential housing brackets defines an aperture to receive the pin, wherein the first plate defines an aperture for receiving the centering pin on the leaf spring, and the second plate includes an attachment pin shaped to be received in the aperture defined by the differential housing bracket.

3. The device according to claim 1 wherein the position of the second plate can be adjusted relative to the first plate in an infinite number of longitudinal positions along an area of contact between the plates.

4. The device according to claim 1 wherein when the plates are positioned between and, respectively, removably secured to one of the leaf springs and differential housing brackets of the automobile, the plates have a combined height of no greater than about 0.5 inch.

5. A rear-wheel alignment device for an automobile having leaf-springs and differential housing brackets, the device comprising adjustably engaging first and second plates that are positioned between and respectively, removably secured to a respective one of the leaf spring and the differential housing bracket of the automobile, the first plate having a substantially flat, continuous bottom surface and including a pair of substantially parallel rails that extend from a substantially smooth upper surface of the first plate, the upper surface and the rails defining a recessed region, the second plate having a substantially smooth bottom surface that is at least partially received in the recessed region so that the upper surface of the first plate and the lower surface of the second plate are in face-to-face contact, the recessed region preventing the second plate from moving in a direction transverse to a longitudinal axis of the automobile.

6. The device according to claim 5 wherein the first and second plates are removably secured to the leaf spring and differential housing bracket respectively.

7. The device according to claim 5 wherein when the plates are positioned between and, respectively, removably secured to one of the leaf springs and differential housing brackets of the automobile, the plates have a combined height of no greater than about 0.5 inch.

8. A rear-wheel alignment device for an automobile having leaf-springs, the leaf springs having a centering pin, and differential housing brackets wherein the brackets define a first aperture configured to receive the centering pin, comprising:

a first plate that is removably secured to a leaf spring of the automobile, the first plate having a substantially smooth and continuous bottom surface, the first plate also having a pair of rails that are connected to and extend from a substantially smooth upper surface of the first plate, the first plate defining a second aperture configured to receive the centering pin; and a second plate, the second plate having a smooth lower surface that adjustably engages in face-to-face contact the upper surface of the first plate between the rails, wherein the second plate includes an attachment pin configured to be received in the first aperture, the pin extending from an upper surface of the second plate, and wherein the second plate is removably secured to at least one of the differential housing brackets of the automobile.

9. The device according to claim 8 wherein when the plates are positioned between and, respectively, removably secured to one of the leaf springs and differential housing brackets of the automobile, the plates have a combined height of no greater than about 0.5 inch.

10. A method for aligning an automobile's rear wheel to include differential housing brackets, the automobile having leaf springs, a differential housing, a passenger's side differential housing bracket, and a driver's side differential housing bracket, the method comprising the steps of:
separating at least one leaf spring from a differential housing of the automobile;
removably securing a first plate to at least one of the leaf springs of the automobile, the first plate having a substantially smooth, continuous lower surface and a smooth upper surface, the upper surface including a pair of substantially parallel rails extending upwardly from the upper surface;
removably securing a second plate to an associated one of the differential housing brackets of the automobile, wherein the second plate has a substantially smooth lower surface;
positioning the first plate on top of the second plate so that at least a portion of the lower surface of the upper plate is received between the rails, wherein the substantially smooth upper surface of the lower plate is in face-to-face contact with the lower surface of the upper plate;
adjusting the position of the first plate relative to the position of the second plate along a longitudinal axis of the automobile while the plates are in face-to-face contact and while the plates bear the weight of the automobile; and
permanently securing the first plate to the second plate, thereby rendering the plates nonadjustable.

11. The method according to claim 10 wherein the securing step comprises welding the first plate to the second plate.

12. The method according to claim 10 wherein first and second plates are respectively attached to a leaf spring and differential housing bracket on both the driver's side and passenger's side of the automobile.

13. The method according to claim 10 wherein the substantially smooth surfaces allow the plates to slide relative to each other while in contact.

14. The method according to claim 10 wherein the plates are secured to each other while bearing the weight of the automobile.

15. The method according to claim 10 wherein when the plates are positioned between and, respectively, removably secured to one of the leaf springs and differential housing brackets of the automobile, the plates have a combined height of no greater than about 0.5 inch.

16. A rear-wheel alignment device for an automobile having an axle, a leaf-spring, a centering pin on the leaf spring, a differential housing, and a differential housing bracket defining an aperture configured to receive the centering pin, the device comprising:
a first plate removably secured to the leaf spring, the first plate having a substantially continuous bottom surface and a smooth upper surface, the first plate including a pair of substantially parallel rails connected to and extending upwardly from the upper surface of the first plate, the rails being spaced apart and extending the entire length of the first plate, the rails and the upper surface defining a channel, the first plate also defining an aperture passing through the upper surface configured for receiving the centering pin on the leaf spring; and
a second plate having an attachment pin extending from an upper surface of the second plate, the attachment pin shaped to be received in the aperture defined by the differential housing bracket, the second plate also having a substantially smooth lower surface that is in face-to-face contact with the upper surface of the first plate, thereby forming an area of contact between the first plate and the second plate, the lower surface of the second plate being at least in part received within the channel such that the second plate is constrained for infinitely adjustable linear movement between the rails and along the entire area of contact within the channel when the upper surface of the first plate is in contact with the lower surface of the second plate such that the weight of the automobile may be transmitted between the first and second plates, the surfaces being sufficiently smooth to permit adjustment of the plates relative to each other while bearing the weight of the automobile, the second plate being removably secured to a differential housing bracket of the automobile, the first plate being welded to the second plate after the plates are adjusted relative to each other.

17. The device according to claim 16 wherein when the plates are positioned between and, respectively, removably secured to one of the leaf springs and differential housing brackets of the automobile, the plates have a combined height of no greater than about 0.5 inch.

18. A method for aligning rear-wheels of an automobile to include a differential housing bracket, the automobile having an axle, leaf-springs, a centering pin on the leaf spring, a differential housing, and differential housing brackets, each bracket defining an aperture configured to receive the centering pin, the method comprising the steps of:
separating at least one leaf spring from a differential housing of the automobile;
removably securing a first plate to the leaf spring of the automobile, wherein the first plate has a substantially smooth, continuous bottom surface and a smooth upper surface, the first plate also including a pair of substantially parallel rails connected to and extending upwardly from the upper surface and along the entire length of the first plate, the rails being spaced apart, the rails and the upper surface defining a channel, the first plate also defining an aperture passing through the upper surface configured for receiving the centering pin;
removably securing a second plate to a differential housing bracket of the automobile wherein the second plate has an attachment pin connected to an upper surface thereof, the attachment pin shaped to be received in the aperture defined by the differential housing bracket, the second plate also having a substantially smooth lower surface;
placing the lower surface of the second plate in face-to-face contact with the upper surface of the first plate, thereby forming an area of contact between the first and second plates, the lower surface of the second plate being at least in part received within the channel such that the second plate is constrained for infinitely adjustable linear movement within the channel and between the rails along the area of contact when the upper surface of the first plate is in contact with the lower surface of the second plate such that the weight of the automobile may be transmitted between the first and second plates, the surfaces being sufficiently smooth to permit adjustment of the plates relative to each other while bearing the weight of the automobile; maintaining the plates in contact;

adjusting the position of the first plate relative to the position of the second plate along a longitudinal axis of the automobile while the plates are in contact and bearing the weight of the automobile; and welding the first plate to the second plate without first removing the weight of the automobile from the plates, thereby rendering the plates non-adjustable.

* * * * *